United States Patent

Sugi et al.

[11] Patent Number: 5,725,688
[45] Date of Patent: Mar. 10, 1998

[54] ROLLING BEARING

[75] Inventors: Hiromi Sugi, Kanagawa; Takashi Nagato, Tokyo; Kenji Yamamura, Kanagawa, all of Japan

[73] Assignee: NSK Ltd., Tokyo, Japan

[21] Appl. No.: 813,927

[22] Filed: Feb. 25, 1997

Related U.S. Application Data

[63] Continuation of Ser. No. 325,975, Oct. 21, 1994, abandoned.

[30] Foreign Application Priority Data

Oct. 21, 1993 [JP] Japan ................. 5-263811

[51] Int. Cl.⁶ ................. C23C 8/26; F16C 33/22
[52] U.S. Cl. ................. 148/318; 148/906; 384/492; 384/912
[58] Field of Search ................. 148/318, 906; 384/492, 912

[56] References Cited

U.S. PATENT DOCUMENTS

| | | | |
|---|---|---|---|
| 1,914,990 | 6/1933 | Burr | 148/318 |
| 2,228,106 | 1/1941 | Beria | 148/318 |
| 4,917,860 | 4/1990 | Culling | 420/49 |
| 5,030,017 | 7/1991 | Murakami et al. | 384/492 |
| 5,338,377 | 8/1994 | Mitamura et al. | 148/318 |

FOREIGN PATENT DOCUMENTS

| | | |
|---|---|---|
| A10411931 | 2/1991 | European Pat. Off. |
| 53-47861 | 12/1978 | Japan . |
| 58-113628 | 7/1983 | Japan . |
| 1-220718 | 9/1989 | Japan . |
| 1-220719 | 9/1989 | Japan . |
| 4-254572 | 9/1992 | Japan ................. 148/319 |
| A2234523 | 2/1991 | United Kingdom . |
| A2235212 | 2/1991 | United Kingdom . |

*Primary Examiner*—John Sheehan
*Attorney, Agent, or Firm*—Sughrue, Mion, Zinn, Macpeak & Seas, PLLC

[57] ABSTRACT

At least one of surfaces including the raceway of an inner ring, the raceway of an outer ring, and at least the rolling surfaces of rolling elements is made of a steel containing nitrogen within the range of from 0.2 to 5.0 wt. % and chromium within the range of from 7.0 to 25 wt. %.

8 Claims, 3 Drawing Sheets

ROLLING BEARING

This is a Continuation of application Ser. No. 08/325,975 filed Oct. 21, 1994 now abandoned.

BACKGROUND OF THE INVENTION

The present invention relates to rolling bearings and, more particularly, to a rolling bearing usable in corrosive environments such as in water, organic solvents, molten metal, liquefied natural gas atmosphere, and corrosive gas atmosphere. The rolling bearing of the present invention is adapted more particularly to applications requiring corrosion resistance under small load and low rotational speed such as in water circulating pumps in kitchen facilities and cooling-water circulating pumps in nuclear reactors.

Conventional rolling bearings used in corrosive environments such as in water, organic solvents, molten metal, liquefied natural gas atmosphere, and corrosive gas atmosphere have no oil film formed on rolling contact surfaces thereof during use, unlike rolling bearings used under oil lubrication. It is for this reason that such rolling bearings require not only corrosion resistance but excellent wear resistance as well.

Developed as a rolling bearing that can be used in such corrosive environments is, e.g., an "all stainless steel" bearing, all of whose inner ring, outer ring, and rolling elements are made of stainless steel. To provide excellent hardness, a martensitic stainless steel containing large amounts of comparatively large-sized chromium carbide (e.g., SUS440C or the like) is used as a material of this "all stainless steel" bearing.

Further, also developed as a rolling bearing usable in corrosive environments are an "all ceramic" bearing on one hand, all of whose inner ring, outer ring, and rolling elements are made of ceramic, and a "stainless steel-ceramic" rolling bearing on the other, whose inner ring and outer ring are made of stainless steel and whose rolling elements are made of ceramic such as silicon nitride. The "all ceramic" bearing is disclosed in, e.g., Japanese Examined Patent Publication No. Sho. 53-47861. The "stainless steel-ceramic" rolling bearing is disclosed in, e.g., Japanese Unexamined Patent Publication Nos. Sho. 58-113628, Hei. 1-220718, and Hei. 1-220719.

While the martensitic stainless steel containing large amounts of comparatively large-sized chromium carbide is used in the "all stainless steel" bearing, an iron-carbon containing martensite forming the matrix of the chromium carbide has such a shortcoming as poor wear resistance against rolling contact under the corrosive environments such as described above. That is, as the stainless steel wears, hard chromium carbide emerges to the surface in the form of tiny projections, and these tiny projections of the chromium carbide cause the mating members to wear. In addition, the tiny projections of the chromium carbide are mixed into the bearing as foreign substances while separated from the matrix to damage the bearing. Therefore, these problems have made it difficult to provide an "all stainless steel" bearing with a long life.

On the other hand, the "all ceramic" bearing is excellent in wear resistance compared with the martensitic stainless steel bearing, but has the disadvantages of being extremely expensive, having low toughness due to mechanical properties thereof and, thus, being susceptible to cracking. Moreover, when the "all ceramic" bearing is used under high temperatures or low temperatures while assembled into a metal shaft and a metal housing, the difference in the coefficient of linear expansion between the ceramic and the metal leads to large clearance fit or excessive close fit, and this promotes cracking of the ceramic. Therefore, this has made it difficult to provide an "all ceramic" bearing with a long life.

Furthermore, the "stainless steel-ceramic" rolling bearing, whose inner ring and outer ring are made of stainless steel and whose rolling elements are made of ceramic such as silicon nitride, has the shortcoming that the stainless steel of which the inner ring and the outer ring are made does not have a sufficient wear resistance against rolling contact under the corrosive environments. And when the stainless steel wears, tiny projections of chromium carbide emerge on the surface of the stainless steel, i.e., the raceway surfaces of the inner and outer rings, and these tiny projections of chromium carbide not only wear the rolling elements but also are suspended while separated from the matrix, causing the bearing to have hard foreign substances mixed therein. As a result, the bearing is damaged.

Still further, a reduction in the life of the rolling bearings also is caused by wear due to sliding contact between the cage and each rolling element as well as wear due to contact between the cage and the inner and outer rings. Worn particles produced by the wear of the cage are readily cause impressions on the rolling surfaces of the inner and outer rings as the bearing rotates, which is another factor for shortening the life of the bearings. Generally, a cage made of a stainless steel such as SUS304 is used. If a lubricant is supplied insufficiently, a portion that is in sliding contact with the rolling elements and a portion that is in contact with the inner and outer rings become significantly worn. However, in the aforementioned conventional examples, nothing has been proposed to improve the wear resistance of the cage.

SUMMARY OF THE INVENTION

The present invention has been made to overcome the aforementioned problems, and an object thereof is, therefore, to provide a rolling bearing with excellent corrosion and wear resistance as well as with a long life under corrosive environments, needless to say under oil lubrication environments.

To achieve the above object, the present invention provides a rolling bearing that includes an inner ring, an outer ring, and a plurality of rolling elements rollable between the inner ring and the outer ring, which is characterized in that at least one of the inner ring, the outer ring, and the rolling element contains nitrogen within the range of from 0.2 to 5.0 wt. % and chromium within the range of from 7.0 to 25.0 wt. % at least in a surface thereof.

The rolling bearing further includes a cage for equally distributing the plurality of rolling elements in the circumferential direction of the inner ring and the outer ring, and in such rolling bearing the cage contains nitrogen within the range of from 0.2 to 5.0 wt. % and chromium within the range of from 7.0 to 25.0 wt. % at least in a surface thereof.

In the rolling bearing, at least one of the inner ring, the outer ring, and the rolling element has a nitrogen containing layer with a depth of at least 50 μm from a surface thereof.

In the rolling bearing, at least one of the inner ring, the outer ring, and the rolling element is made of a stainless steel, SUS440C, as a base material, and contains nitrogen within the range of from 0.2 to 5.0 wt. % at least in a surface thereof.

In the rolling bearing, the cage is made of a stainless steel, SUS304, as a base material, and contains nitrogen within the range of from 0.2 to 5.0 wt. % at least in a surface thereof.

The rolling bearing of the present invention is characterized by having at least one of the surfaces of the raceway of the inner ring, the raceway of the outer ring, the rolling surfaces of the rolling elements, the contact surfaces of the rolling elements in contact with the cage, and the sliding contact surface of the cage made of a steel containing nitrogen within the range of from 0.2 to 5.0 wt. % and chromium within the range of from 7.0 to 25.0 wt. %. Therefore, the corrosion resistance and wear resistance of the rolling bearing can be improved.

The reasons therefor and the criticalness of the respective values will be described below.

A steel containing nitrogen within the range of from 0.2 to 5.0 wt. % and chromium within the range of from 7.0 to 25.0 wt. % exhibits very high hardness. Therefore, bearing parts made of this steel are less worn due to contact even in direct rolling or sliding contact with the mating members. As a result, the emergence of tiny projections of chromium carbide from the steel or the separation thereof from the matrix are prevented, which in turn reduces the wearing and cracking of the mating members. Moreover, the bearing parts made of this steel are rustproof and, therefore, have excellent corrosion resistance.

If the nitrogen content is less than 0.2 wt. %, the steel does not have sufficient hardness, and this makes it difficult to improve the wear resistance and, hence, the life of the bearing can not be increased.

On the other hand, if the nitrogen content exceeds 5.0 wt. %, the steel will contain large amounts of chromium nitride, which makes the bearing susceptible to rust and hence reduces the corrosion resistance of the bearing.

In addition, if the chromium content is less than 7.0 wt. %, the steel is susceptible to rust, which reduces the corrosion resistance of the bearing.

On the other hand, if the chromium content exceeds 25.0 wt. %, the machinability of the steel is impaired to make the steel hard to machine, thus elevating the cost of manufacture of the bearing, although excellent corrosion resistance is maintained.

It is for the aforementioned reasons that the content of nitrogen is limited within the range of from 0.2 to 5.0 wt. % and the content of chromium is limited within the range of from 3.0 to 25.0 wt. %. In addition, to provide excellent corrosion resistance and wear resistance to the aforementioned steel (bearing material), it is necessary to satisfy both of these nitrogen and chromium content requirements.

The aforementioned advantages can be obtained by having at least one of the surfaces of the raceway of the inner ring, the raceway of the outer ring, the rolling surfaces of the rolling elements, the contact surfaces of the rolling elements in contact with the cage, and the sliding contact surface of the cage made of the steel (bearing material) of the present invention.

The aforementioned advantages can be obtained more efficiently by having all of the surfaces of the raceway of the inner ring, the raceway of the outer ring, the rolling surfaces of the rolling elements, the contact surfaces of the rolling elements in contact with the cage, and the sliding contact surface of the cage made of the steel (bearing material) of the present invention.

Still further, the aforementioned advantages can be obtained efficiently also by having bearing parts that are not made of the steel (bearing material) of the present invention made of ceramic. The reason therefor is that ceramic has excellent corrosion resistance and wear resistance and that contact between metal and ceramic is less subject to wear than contact between metals.

Particularly, the aforementioned advantages can be obtained more efficiently by having at least one of the surfaces of the raceway of the inner ring and the raceway of the outer ring made of the steel (bearing material) of the present invention and by having the rolling elements made of ceramic.

In addition, wear on the contact surfaces between the cage and the rolling elements and on the contact surfaces between the cage and the inner and outer rings can be suppressed by having the sliding contact surfaces of the cage made of the steel (bearing material) of the present invention.

DETAILED DESCRIPTION OF THE PREFERRED EMBODIMENTS

Preferred embodiments of the present invention will now be described with reference to the drawings.

Figure 1A:
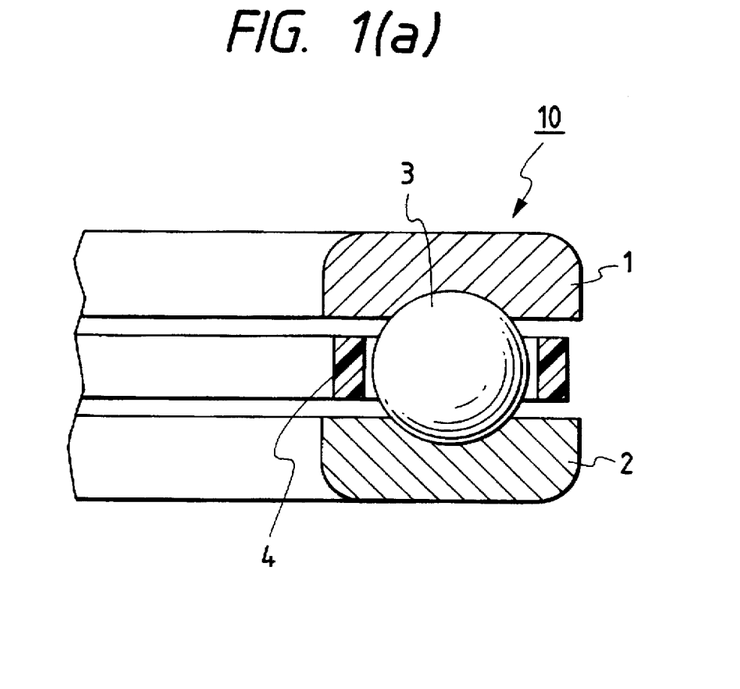
FIGS. 1(a) and 1(b) are, respectively, a partially sectional view of a thrust ball bearing, which is an embodiment of the present invention.

FIG. 1(a) is a partially sectional view of a known thrust ball bearing, to which an embodiment of the present invention is applied.

Since a thrust ball bearing 10 shown in FIG. 1(a) is known, a detailed description thereof will be omitted. The thrust ball bearing 10 includes: an inner ring 1; an outer ring 2; a plurality of rolling elements 3 interposed between the raceway surface of the inner ring 1 and the raceway surface of the outer ring 2; and a cage 4 that retains the rolling elements 3 equidistantly in the circumferential direction by enclosing the rolling elements 3 individually therein.

The relationship between the chromium content in a steel (wt. %) and the corrosion resistance of the steel is examined in the following way.

First, steels containing chromium in amounts of 3 wt. %, 5 wt. %, 7 wt. %, 10 wt. %, 13 wt. %, 25 wt. %, and 30 wt. %, respectively, were prepared. Then, cylindrical test pieces, each of whose diameter is 15 mm and whose height is 5 mm, were prepared and left inside a test box having an environment as shown in Table 1 to observe the rusting states of the respective steels.

It should be noted that the test pieces were subjected to a heat treatment so that the nitrogen content of 0.2 wt. % in the surfaces thereof were used.

The results of the examination are shown in Table 2.

Table 2 additionally shows the results of machinability.

It should also be noted that other major chemical compositions contained in the steels are shown in Table 3 (in wt.

% with respect to all the remaining chemical compositions excluding iron and chromium).

TABLE 1

| Test conditions | |
|---|---|
| Ambient temperature | 50° C. |
| Humidity | 100% |
| Time in which test pieces were left inside test box | 20 hrs. |

TABLE 2

| Content of chromium (wt. %) | Occurrence of rust | Machinability |
|---|---|---|
| 3.0 | Large | Good |
| 5.0 | Small | Good |
| 7.0 | None | Good |
| 10.0 | None | Good |
| 13.0 | None | Good |
| 25.0 | None | Good |
| 30.0 | None | Poor |

TABLE 3

| Chemical compositions | Content (wt. %) |
|---|---|
| C | 0.70 |
| Si | 0.25 |
| Mn | 0.65 |
| P | 0.015 |

It was verified from Table 2 that the steels containing chromium within the range of from 7.0 to less than 30.0 wt. % were free from rust end excellent not only in corrosion resistance but also in machinability. It was also verified that the steels containing chromium in an amount of 30.0 wt. % were free from rust but poor in machinability i.e., the steels were hard to machine.

In reality, since machinability is gradually impaired as the content of chromium exceeds 25.0 wt. %, the content of chromium that can give excellent corrosion resistance and machinability is within the range of from 7.0 to 25.0 wt. %.

An embodiment in which the steel of the present invention is applied to the inner ring and the outer ring will be described next.

The inner ring 1 and the outer ring 2 of a thrust ball bearing 10 are made of the steel of the present invention (containing nitrogen within the range of from 0.2 to 5.0 wt. % and chromium within the range of from 7.0 to 25.0 wt. %) by the following method.

Figure 2:
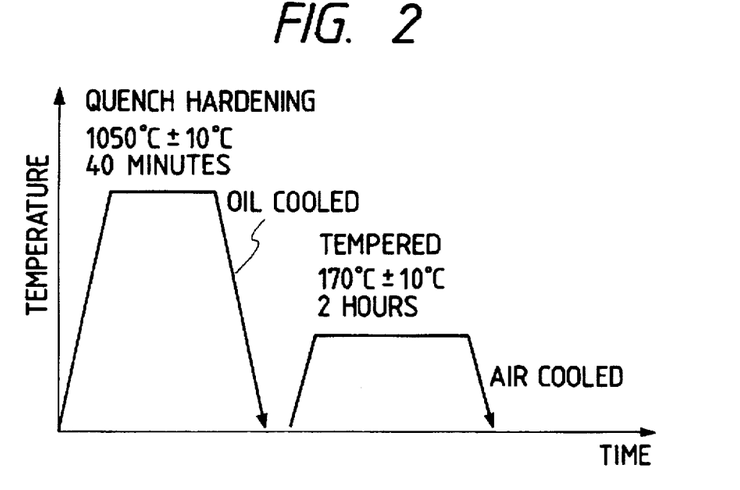
FIG. 2 is a diagram showing the history of a heat treatment carried out in the embodiment of the present invention.

The inner ring 1 and the outer ring 2 were made of a stainless steel, SUS440C, that was machined with some grinding margin left, and the thus prepared rings were subjected to a quench hardening process at temperatures 1050° C.±10° C. for 40 minutes, oil cooled, and further tempered at temperatures 170° C.±10° C. for 2 hours as shown in FIG. 2 to obtain hardness of 700 or more in Vickers hardnesses (HV).

It should be noted that the major chemical compositions other than iron of SUS440C used in this embodiment are shown in Table 4.

TABLE 4

| Chemical compositions | Content (wt. %) |
|---|---|
| C | 0.95 to 1.20 |
| Si | 1.00 or less |
| Mn | 1.00 or less |
| P | 0.004 or less |
| S | 0.03 or less |
| Cr | 16.00 to 18.00 |
| Mo | 0.75 or less |

Then, this steel was ground to form the inner rings 1 and outer rings 2 of thrust ball bearings 10. The thus formed inner rings 1 and outer rings 2 were thereafter ion-nitrided so that the nitrogen contents in the surfaces thereof (the concentration of nitrogen) are: 2.0 wt. % (Embodiment 1), 1.0 wt. % (Embodiment 2), 0.5 wt. % (Embodiment 3), and 0.2 wt. % (Embodiment 4).

It should be noted that adjustment of the nitrogen content in the surface was made by selecting grinding margins (i.e., by adjusting the nitrided layer depth).

Figure 3:
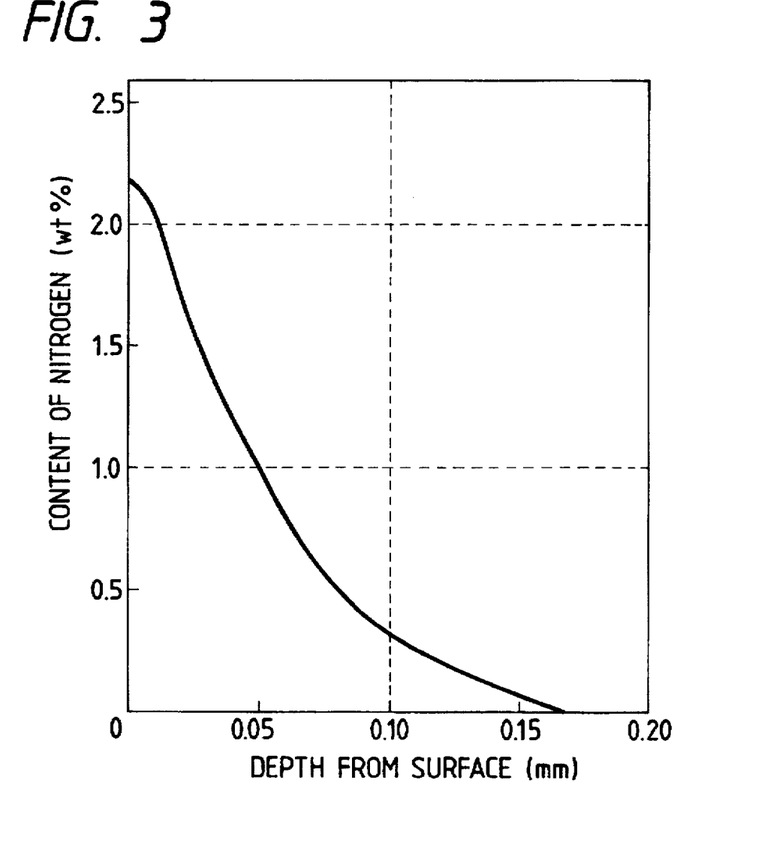
FIG. 3 is a diagram showing a relationship between the depth from the surface of a steel obtained by the embodiment of the present invention and the content of nitrogen at that portion.

The relationship between the surface depths of the inner ring 1 and outer ring 2 and the nitrogen contents (the concentration of nitrogen) at such surface depths is shown in FIG. 3.

To further improve the surface roughnesses of the raceways of the inner ring 1 and outer ring 2, a lapping or grinding process may be effected after ion-nitriding.

Then, nitrogen was added to the molten steel during steelmaking to prepare an inner ring 1 and an outer ring 2 that contain nitrogen in an amount of 0.35 wt. % in the surfaces thereof (Embodiment 5).

It should be noted that the chemical compositions of the inner ring 1 and outer ring 2 prepared as Embodiment 5 are shown in Table 5.

TABLE 5

| Chemical compositions | Content (wt. %) |
|---|---|
| C | 0.15 |
| N | 0.35 |
| Si | 0.50 |
| Mn | 0.62 |
| Cr | 14.9 |
| Mo | 1.12 |
| Ni | 0.18 |
| V | 0.05 |
| Fe | Bal. |

Then, as comparative examples, after subjecting the stainless steel, SUS440C, to the heat treatment shown in FIG. 2 and to a finish grinding process, an inner ring 1 and an outer ring 2 that contain nitrogen (the concentration of nitrogen) in an amount of 0.1 wt. % in the surfaces thereof (Comparative Example 1) was prepared after an ion-nitriding process, and also an inner ring 1 and an outer ring 2 made of the stainless steel, SUS440C, (with a surface hardness of 680 in Vickers hardness (HV) and containing nitrogen in an amount of 0 wt. % in the surfaces thereof) (Comparative Example 2) was prepared.

Then, rolling elements 3 made of silicon nitride (ceramic) (Grade EC141 manufactured by NGK Spark Plug is used in this embodiment) and cages 4 made of fluororesin compounds (PTFE-containing resin) (Polimex F20 (trade name) manufactured by NSK Ltd. is used in this embodiment) were prepared, and these rolling elements 3 and cages 4 were assembled into thrust ball bearings 1 shown in FIG. 1(a) together with the inner rings 1 and outer rings 2 prepared in the aforementioned processes (Embodiments 1 to 5 and Comparative Examples 1 and 2).

A performance test (durable life test) was carried out on these thrust ball bearings (Embodiments 1 to 5 and Comparative Examples 1 and 2) in the following way.

Figure 4:
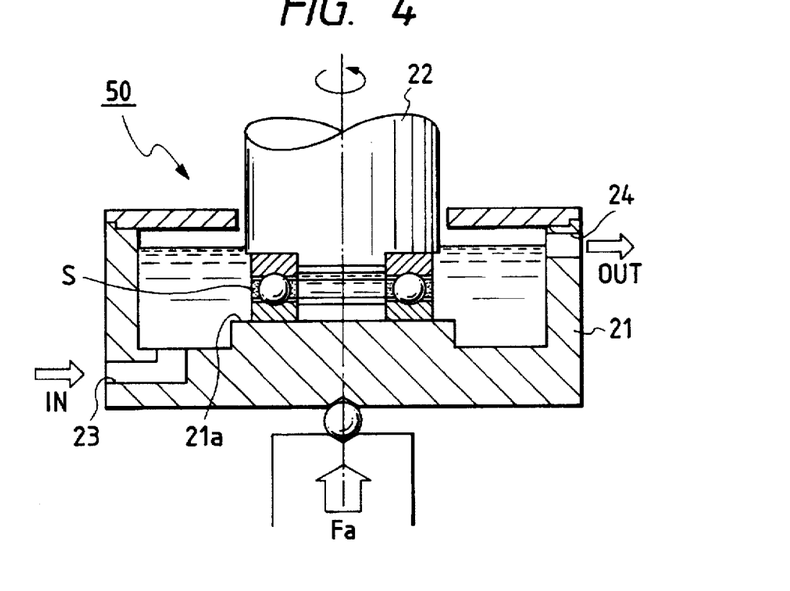
FIG. 4 is a sectional view showing the construction of a test apparatus used for a durable life test in the embodiment of the present invention.

A known test device used in this embodiment is shown in FIG. 4.

Since this test device 50 is known, only how this device is used will be described briefly.

First, a test bearing S is interposed between a bench surface 21a inside a test bench container 21 and a rotating shaft 22 disposed so as to confront the bench surface 21a. Then, the rotating shaft 22 is rotated with an axial load Fa applied to the bottom of the test bench container 21 to operate the test bearing S. In this instance, water is supplied to the test bench container 21 from a supply port 23 disposed at a lower portion of the test bench container 21, and is discharged from a discharge outlet 24 disposed at an upper portion thereof.

Using this test device 50, Embodiments 1 to 5 and Comparative Examples 1 and 2 used as test bearings S were subjected to a durable life test under the conditions shown in Table 6.

It should be noted that the inner ring 1 was attached to the rotating shaft 22 and the outer ring 2 was attached to the bench surface 21a in this embodiment. In addition, the durable life time was defined as a period of time elasping before vibrations of each test bearing S exceed a predetermined value (5 times the initial value in this embodiment) by damage such as wear or flaking of a test bearing S. Further, with respect to those test bearings whose vibrations do not exceed the predetermined value even after 500 test hours, the test was interrupted after 500 hours, and a durable life time of 500 hours or more was given.

TABLE 6

| Test conditions | |
| --- | --- |
| No. of revolutions | 1000 rpm |
| Load | Fa = 150 Kgf |
| Bearing | |
| Type | Thrust ball bearing (#51305) |
| No. of balls | 6 |

Figure 5:
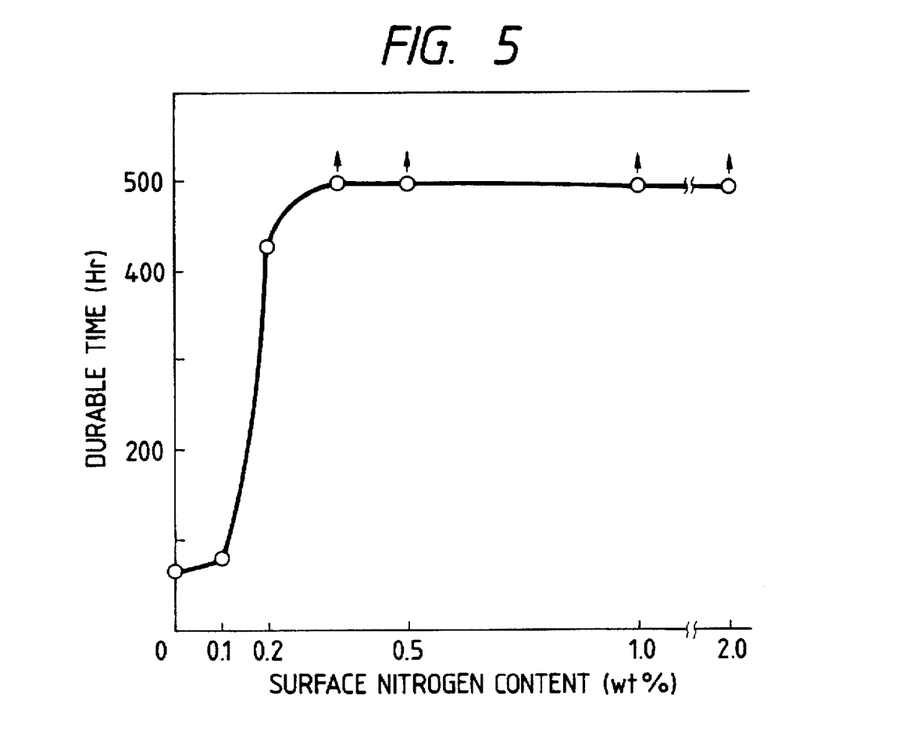
FIG. 5 is a diagram showing a relationship between the nitrogen content in the surface of a steel obtained by the embodiment of the present invention and the durable time.

The results of the test are shown in Table 7 and FIG. 5.

TABLE 7

| | | Inner ring & outer ring (Rolling surfaces) | | | |
| --- | --- | --- | --- | --- | --- |
| | | Material (Surface hardness HV) | Surface nitrogen content: wt. % (Nitrided layer depth mm) | Rolling elements Material | Cage Material | Durable time (hr) |
| A | 1 | SUS440C (950) | 2.0 (0.15) | Silicon nitride | Fluoro-resin compounds | 500 or more |
| | 2 | SUS440C (940) | 1.0 (0.12) | Silicon nitride | Fluoro-resin compounds | 500 or more |

TABLE 7-continued

| | | Inner ring & outer ring (Rolling surfaces) | | | |
| --- | --- | --- | --- | --- | --- |
| | | Material (Surface hardness HV) | Surface nitrogen content: wt. % (Nitrided layer depth mm) | Rolling elements Material | Cage Material | Durable time (hr) |
| | 3 | SUS440C (860) | 0.5 (0.09) | Silicon nitride | Fluoro-resin compounds | 500 or more |
| | 4 | SUS440C (840) | 0.2 (0.05) | Silicon nitride | Fluoro-resin compounds | 430 |
| | 5 | Nitrided during steel-making (700) | 0.35 | Silicon nitride | Fluoro-resin compounds | 500 or more |
| B | 1 | SUS440C (830) | 0.1 (0.03) | Silicon nitride | Fluoro-resin compounds | 80 |
| | 2 | SUS440C (680) | 0 | Silicon nitride | Fluoro-resin compounds | 65 |

Note: A = Embodiment B = Comparative Example

It was verified from Table 7 and FIG. 5 that the thrust ball bearings (Embodiments 1 to 5) whose inner rings 1 and outer rings 2 (rolling surfaces) were made of the steels containing nitrogen within the range of from 0.2 to 2.0 wt. % and chromium within the range of from 7.0 to 25.0 wt. % had extremely increased durable times compared with Comparative Examples 1 and 2.

It should be noted that although a long durable time (500 hours or more) can be obtained even if the content of nitrogen is further increased, the content of nitrogen exceeding 5.0 wt. % increases chromium nitride to impair corrosion resistance.

From the curve of the nitrogen content (wt. %) in function of the surface depth (mm) shown in FIG. 3 showing the example in which the stainless steel, SUS404C, is ion-nitrided, it is understood that the content of nitrogen decreases with increasing depth from the surface toward the core, and the content of nitrogen is 0 wt. % at a depth of 0.17 mm.

When forming the target minimum content of nitrogen according to the present invention, which is 0.2 wt. %, in the surfaces of the inner ring, outer ring, rolling elements, and cage, it is apparent from FIG. 3 that the nitrogen content equal to 0.2 wt. % is obtained at a depth of 0.12 mm from the surface (e.g., at a portion obtained by grinding). Thus, to obtain a high nitrogen content, if the depth from the surface (e.g., depth to be ground) is made shallow, the nitrogen content in the surface can be made high.

Now let us take a look at the relationship between the durable life and the nitrogen content in the surface in wt. % shown in FIG. 5. It is understood from FIG. 5 that a predetermined durable life (430 hours or more) can be obtained only when the nitrogen content in the surface is 0.2 wt. % or more.

FIGS. 3 and 5 indicate that it is possible to know how much grinding or lapping is necessary after ion-nitriding in order to achieve the target nitrogen content in the surface in wt. % when the necessary content of nitrogen in the surface in wt. % is found from the curve in FIG. 3 (when the curve in FIG. 3 is obtained).

FIG. 3 shows an exemplary curve of the ion-nitriding process. This curve is changed by changing the ion-nitriding conditions. Therefore, in order to obtain the content of nitrogen in wt. % as defined by the present invention, it is necessary to find curves such as shown in FIG. 3 for different ion-nitriding conditions. That is, surfaces containing nitrogen within the range of 0.2 to 5.0 wt. % to obtain a long durable life can be formed based on such curve data on different ion-nitriding conditions.

Further, as is apparent from FIG. 3, if at least the contents of nitrogen and chromium in the surface are defined, there is no likelihood that the contents of nitrogen and chromium are reduced drastically as the depth from the surface is increased, which means that at least a layer so thick as to bear rolling- or sliding-associated stresses is formed beneath the surface. In other words, the contents of nitrogen and chromium are either gradually decreased or maintained at the same level as the surface.

It is understood that the same satisfactory results were obtained irrespective of the steelmaking processes; i.e., even if steels satisfying the aforementioned conditions are prepared by ion-nitriding or by adding nitrogen during steelmaking.

A similar durable life test was carried out on a test bearing in which either one of the inner ring 1 and the outer ring 2 was made of the steel of the present invention. It was verified from the results that the durable time of the test bearing was increased compared with the conventional products.

Then, the stainless steel, SUS440C, was subjected to the heat treatment shown in FIG. 2, to a finish grinding process, and then to an ion-nitriding process to prepare an inner ring 1, an outer ring 2, and rolling elements 3 whose nitrogen content in the surface (concentration of nitrogen) was 0.4 wt. %. A thrust ball bearing 10 shown in FIG. 1(a) was assembled using these outer ring 1, inner ring 2, rolling elements 3, and a cage 4 similar to the aforementioned (Embodiment 6).

Then, an inner ring 1 and an outer ring 2 similar to those of Embodiment 6 were prepared, and a thrust ball bearing 10 shown in FIG. 1(a) was assembled using these inner ring 1 and outer ring 2, and rolling elements 3 made of SUS440C (with a surface hardness of 680 in Vickers hardness (HV) and with a content of nitrogen in the surface being 0 wt. %), and a cage 4 similar to the aforementioned (Embodiment 7).

Then, as a comparative example, a thrust ball bearing 10 shown in FIG. 1(a) was assembled using an inner ring 1, an outer ring 2, rolling elements 3, which were made of the stainless steel, SUS440C (with a surface hardness of 680 in Vickers hardness (HV) and with a content of nitrogen in the surface being 0 wt. %), and a cage 4 similar to the aforementioned (Comparative Example 3).

Embodiments 6 and 7 as well as Comparative Example 3 were subjected to a performance test (durable life tests) similar to the aforementioned. The results of the test are shown in Table 8.

TABLE 8

|   |   | Inner ring & outer ring (Rolling surfaces) | | Rolling elements | | | |
|---|---|---|---|---|---|---|---|
|   |   | Material (Nitrogen in surface wt. %) | Surface hardness (HV) | Material (Nitrogen in surface wt. %) | Surface hardness (HV) | Cage Material | Durable time (hr) |
| A | 6 | SUS440C (0.4) | 850 | SUS440C (0.4) | 850 | Fluororesin compounds | 230 |
|   | 7 | SUS440C (0.4) | 850 | SUS440C (0) | 680 | Fluororesin compounds | 143 |
|   | 8 | SUS440C (0) | 680 | SUS440C (0.4) | 850 | Fluororesin compounds | 150 |
| B | 3 | SUS440C (0) | 680 | SUS440C (0) | 680 | Fluororesin compounds | 34 |

Note: A = Embodiment  B = Comparative Example

It was verified from Table 8 that Embodiments 6 and 7 had a greatly increased durable time compared with the comparative example, although the durable time was decreased compared with the test bearings using the rolling elements 3 made of silicon nitride (ceramic) (see Table 7).

Then, a durable life test similar to the aforementioned was carried out on a test bearing in which only the rolling elements 3 were made of the steel of the present invention. It was verified that the durable time was increased compared with the conventional products (Embodiment 8).

While the cage made of plastic such as fluororesin compounds was used in the aforementioned embodiments, a cage made of carbon or a cage made of stainless steel such as SUS304 may also be used to obtain satisfactory results under the conditions of the aforementioned embodiments.

However, fluororesin compounds, being softened at temperatures over 200° C., cannot be used depending on the operating conditions of the bearing (e.g., in high-temperature environments). Also, carbon, being brittle and susceptible to crack, is not suitable for use in bearings rotating at high speeds.

An embodiment in which the steel of the present invention is applied to a cage will be described next.

A stainless steel, SUS304, that was subjected to a solution heat treatment was finished into the shape of a cage, and then subjected to an ion-nitriding process to prepare a cage 4 whose nitrogen content in the surface (concentration of nitrogen) was 0.5 wt. %.

It should be noted that the major chemical compositions of the stainless steel, SUS304, used in this embodiment are shown in Table 9.

TABLE 9

| Chemical compositions | Content (wt. %) |
|---|---|
| C | 0.08 or less |
| Ni | 8.00 to 10.5 |
| Cr | 18.0 to 20.0 |

Figure 1B:
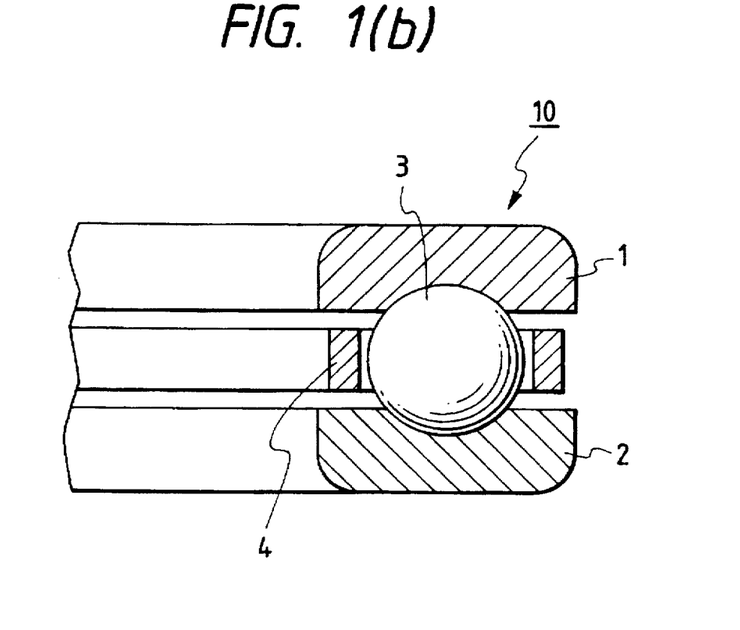

A thrust ball bearing 10 shown in FIG. 1(b) was assembled using this cage 4, an inner ring 1 and an outer ring 2 similar to those of Embodiment 6, and rolling elements 3 made of silicon nitride (Embodiment 9).

Then, as a comparative example, the stainless steel, SUS304, was finished into the shape of a cage, and then subjected to an ion-nitriding process to prepare a cage 4 whose nitrogen content in the surface (concentration of nitrogen) was 0.1 wt. % or less. A thrust ball bearing 10 shown in FIG. 1(b) was assembled using this cage 4 and an inner ring 1, an outer ring 2, and rolling elements 3 similar to those of Embodiment 9 (Comparative Example 4).

Embodiment 9 and Comparative Example 4 were subjected to a performance test similar to the aforementioned (durable life test). The results of such test are shown in Table 10.

TABLE 10

| | | Inner ring & outer ring | Cage | | |
|---|---|---|---|---|---|
| | | (Rolling surfaces) Material (Nitrogen content in surface wt. %) | Rolling elements Material | Material (Surface hardness HV) | Nitrogen content in surface % (Nitrided layer depth mm) | Durable time (hr) |
| A | 9 | SUS440C (0.4) | Silicon nitride | SUS304 (950) | 0.5 (0.13) | 500 or more |
| B | 4 | SUS440C (0.4) | Silicon nitride | SUS304 (830) | 0.1 or less (0.03) | 195 |

Note: A = Embodiment  B = Comparative Example

It was verified from Table 10 that Embodiment 9 had an extremely increased durable time compared with Comparative Example 4.

Then, a test bearing was prepared by having only a cage 4 made of the steel of the present invention, and was subjected to a durable life test similar to the aforementioned. It was verified from the results of such test that such test bearing had an increased durable time compared with the conventional products.

In the Embodiment 9 and Comparative Example 4, a cage pocket was worked by machining. However, the similar tendency can be seen even if a cage is made by pressing work.

From the foregoing, it was proven that the rolling bearing having at least one of the surfaces of the raceway of the inner ring, the raceway of the outer ring, the rolling surfaces of the rolling elements, the contact surfaces of the rolling elements in contact with the cage, and the sliding surface of the cage made of a steel that contained nitrogen within the range of from 0.2 to 5.0 wt. % and chromium within the range of from 7.0 to 25.0 wt. % exhibited an increased life.

It should be noted that although the ion-nitriding process of the stainless steels, SUS440C and SUS304, is employed in the embodiments to obtain a steel that contains nitrogen within the range of from 0.2 to 5.0 wt. % and chromium within the range of from 7.0 to 25.0 wt. % in a rolling contact surface or sliding contact surface thereof, the method of making such steel is not limited thereto. Other methods may be employed as long as a steel that contains nitrogen within the range of from 0.2 to 5.0 wt. % and chromium within the range of from 7.0 to 25.0 wt. % in a rolling contact surface or sliding contact surface thereof can be made. Particularly, the method of preparing the cage may involve the steps of: first press-working a material into a predetermined shape and then nitriding the press-worked material.

Further, to prevent large-sized chromium carbide from being formed in bearing parts, it is preferable to have the steel contain carbon within 0.5 wt. %.

While the case where a thrust ball bearing is assembled using the bearing material, which is the steel of the present invention, has been described in the embodiments, the application of the present invention is not limited thereto. It goes without saying that the steel of the present invention may be applied to other types of rolling bearings such as ball bearings of radial ball bearings, cylindrical roller bearings, tapered roller bearings, and barrel-shaped roller bearings to obtain similar advantages.

While the rolling elements made of silicon nitride is used in the embodiments, rolling elements made of other ceramics, such as silicon carbide, zirconia, and alumina may also be used.

While the cage made of fluororesin compounds is used in the embodiments, a cage made of resin such as polyamide or polyacetal, and of a carbon-containing material may also be used.

Moreover, while the examples in which the respective rolling bearings have the cage have been described in the embodiments, the present invention is applicable to full type roller bearings and full type ball bearings without a cage. In such a case, it is preferable that rolling elements be made of ceramic or of the steel according to the present invention.

As described in the foregoing, the rolling bearing of the present invention is characterized by having at least one of the surfaces of the raceway of the inner ring, the raceway of the outer ring, the rolling surfaces of the rolling elements, the contact surfaces of the rolling elements in contact with the cage, and the sliding contact surface of the cage made of a steel that contains nitrogen within the range of from 0.2 to 5.0 wt. % and chromium within the range of from 7.0 to 25.0 wt. %. Therefore, the rolling bearing not only is given excellent corrosion resistance, but also can prevent both the rolling bearing itself as well as the mating members from wearing, thereby allowing the occurrence of cracking to be reduced. As a result, the present invention can provide a rolling bearing with excellent corrosion and wear resistance as well as with a long life even under corrosive environments, and needless to say under oil lubrication environments.

What is claimed is:

1. A rolling bearing, comprising:
   an inner ring;
   an outer ring; and
   a plurality of rolling elements rotatable between said inner ring and said outer ring;
   wherein at least one of said inner ring, said outer ring, and said rolling elements contains chromium within a range of 7.0 to 25.0 wt. %, and contains nitrogen within a range of from 0.2 to 5.0 wt. % at least in a surface portion thereof; and
   wherein said surface portion has a depth of at least 50 μm from a surface thereof.

2. A rolling bearing according to claim 1, further comprising a cage for equally distributing said plurality of rolling elements in a circumferential direction of said inner ring and said outer ring, wherein said cage is made of said alloy steel.

3. A rolling bearing according to claim 1 or 2, wherein at least one of said inner ring, said outer ring, and said rolling elements is made of a stainless steel, SUS440C, as a base material.

4. A rolling bearing according to claim 2, wherein said cage is made of a stainless steel, SUS304, as a base material.

5. The rolling bearing of claim 1, wherein said alloy steel contains less than or equal to 0.5 wt. % C.

6. A rolling bearing according to claim 1, wherein at least one of said inner ring, said outer ring, and said rolling elements contains nitrogen within a range of from 0.2 to 2.0 wt. % at least in a surface portion thereof.

7. A rolling bearing according to claim 6, wherein said surface portion has a depth of about 0.17 mm.

8. A rolling bearing according to claim 1, wherein said surface portion has a depth of about 0.17 mm.

* * * * *